(12) United States Patent
Vossenkaul et al.

(10) Patent No.: US 12,005,398 B2
(45) Date of Patent: *Jun. 11, 2024

(54) METHOD FOR FILTERING A LIQUID AND FILTER DEVICE

(71) Applicant: MEMBION GMBH, Roetgen (DE)

(72) Inventors: Klaus Vossenkaul, Aachen (DE); Dirk Volmering, Aachen (DE)

(73) Assignee: MEMBION GMBH, Roetgen (DE)

( * ) Notice: Subject to any disclaimer, the term of this patent is extended or adjusted under 35 U.S.C. 154(b) by 119 days.

This patent is subject to a terminal disclaimer.

(21) Appl. No.: 17/722,356

(22) Filed: Apr. 17, 2022

(65) Prior Publication Data

US 2022/0266200 A1 Aug. 25, 2022

Related U.S. Application Data

(63) Continuation of application No. PCT/EP2020/080074, filed on Oct. 26, 2020.

(30) Foreign Application Priority Data

Oct. 28, 2019 (DE) .......................... 102019129074.0

(51) Int. Cl.
*B01D 65/02* (2006.01)
*B01D 63/02* (2006.01)
(Continued)

(52) U.S. Cl.
CPC ............. *B01D 65/02* (2013.01); *B01D 63/02* (2013.01); *C02F 1/44* (2013.01);
(Continued)

(58) Field of Classification Search
CPC ........ B01D 63/02; B01D 63/04; B01D 65/02; B01D 2315/06; B01D 2321/185;
(Continued)

(56) References Cited

U.S. PATENT DOCUMENTS

2008/0017558 A1 1/2008 Pollock
2009/0194477 A1* 8/2009 Hashimoto ............ B01D 63/02
210/636

(Continued)

FOREIGN PATENT DOCUMENTS

CN 104084049 A 10/2014
CN 105854619 A 8/2016
(Continued)

*Primary Examiner* — Patrick Orme
(74) *Attorney, Agent, or Firm* — Von Rohrscheidt Patents

(57) ABSTRACT

A method the filtering a liquid in a membrane filter immersed in the liquid and including membranes, the method including introducing a gas through a gas introduction device into a base of the membrane filter in successive pulses so that the membranes are cleaned wherein the gas introduction device includes a liquid flow channel which vertically penetrates a gas collection cavity and admits the liquid into a bottom of membrane filter; and initially filling a gas volume arranged below a free surface of the liquid and defined in a downward direction by an enclosed level of the liquid with the gas wherein the gas simultaneously displaces the liquid top down from a gas lifting channel until the enclosed level of the liquid drops below an inlet cross section of a gas flow out channel.

13 Claims, 6 Drawing Sheets

(51) Int. Cl.
  *C02F 1/44* (2023.01)
  *C02F 3/20* (2023.01)
  *C02F 3/12* (2023.01)

(52) U.S. Cl.
  CPC ...... *B01D 2321/185* (2013.01); *C02F 3/1273* (2013.01); *C02F 3/208* (2013.01); *C02F 2303/16* (2013.01)

(58) Field of Classification Search
  CPC .......... C02F 1/44; C02F 3/1273; C02F 3/208; C02F 2303/16
  See application file for complete search history.

(56) References Cited

U.S. PATENT DOCUMENTS

| | | | | |
|---|---|---|---|---|
| 2015/0265973 | A1* | 9/2015 | Phelps | B01D 61/20 210/636 |
| 2016/0114292 | A1* | 4/2016 | Colby | B01D 65/08 210/151 |

FOREIGN PATENT DOCUMENTS

| | | |
|---|---|---|
| KR | 20190002119 A | 1/2019 |
| WO | WO2008153818 A1 | 12/2008 |
| WO | WO2011028341 A1 | 4/2016 |
| WO | WO2016064466 A1 | 4/2016 |

\* cited by examiner

METHOD FOR FILTERING A LIQUID AND FILTER DEVICE

RELATED APPLICATIONS

This application is a continuation of International Paten Application PCT/EP2020/080074 filed on Oct. 26, 2020 claiming priority from German Patent Application DE 10 2019 129 074.0 filed on Oct. 28, 2019, both of which are incorporated in their entirety by this reference.

FIELD OF THE INVENTION

The invention relates to a method for filtering a liquid in a membrane filter immersed into the liquid and to a membrane filter configured to perform the method.

BACKGROUND OF THE INVENTION

A generic method and a generic gas introduction device are known from US 2015/026 5973 A1, CN 104084049 A and CN 105854619 A.

The known methods and the known gas introduction devices are configured for introducing gas into membrane filters that can be found e.g; in membrane bioreactors (MBR). The gas introduction device is positioned below the membrane filters and supplied with an essentially constant air volume flow which then flows out of the gas introduction device in pulses.

In order to prevent a plugging of the membranes by filtered substances, air is introduced from below into the membrane filters on a path towards a surface of the liquid, the gas flows through the membrane filters installed on top of the gas introduction device. The shear force of the two-phase flow made from air and liquid to be filtered flushes the membranes.

The pulsed exit of the liquid generates higher shear forces than continuous gas introduction while simultaneously preventing a channeling of the air, this means the rising air bubbles always have to be formed anew and thus always find new paths through the membrane filter.

A gas introduction device that is constantly supplied with air and that lets out the air in pulses is also designated as a geyser.

A gas volume that is built up in the gas collection cavity is pulled through the gas lifting channel connected to the inlet cross section when gas flows out of the gas introduction device through the principle of communicating pipes so that the gas collection cavity is substantially emptied.

During emptying of the gas collection cavity, the outflowing gas volume flow suctions liquid through the compensation inlet and transports the liquid through the outflow channel according to the air lift pump effect. This the advantage that the gas volume flow subsides more quickly after emptying the gas collection cavity so that the gas introduction device can be operated with a higher gas flow.

In the known methods and filter devices the air flows from the geyser (gas introduction device) initially into a laterally open portion so that a large portion of the liquid displaced by the air is laterally displaced from the module and can thus not be used for flushing the membranes. Furthermore, depending on the size of the air pulse a portion of the air escapes at a bottom of the module out of the module in a lateral direction and rises adjacent to the membrane filter, unused this means without a flushing effect upon the membranes.

In the background of the invention WO 2016/064466 A (Koch Membrane Systems), US 2009/0194477 A1 (Asahi Kasai), U.S. Pat. No. 10,179,311 B2 (Sumitomo Electric), CN104519984B B (Samsung Cheil Industries), KR20190002717 A (Mitsubishi Chemical) and WO 2011/028341 A1 (Zenon Technology Partnership) disclose gas introduction devices that do not include a compensation inlet and that are therefore only operable with a rather low gas volume feed in a pulsating manner. Also in these filter devices air flows during exit from the geyser into a laterally open area.

BRIEF SUMMARY OF THE INVENTION

Thus, it is an object of the invention to improve a purging effect of air that is being introduced.

The object is achieved by a method the filtering a liquid in a membrane filter immersed in the liquid and including membranes, the method including introducing a gas through a gas introduction device into a base of the membrane filter in successive pulses so that the membranes are cleaned wherein the gas introduction device includes a liquid flow channel which vertically penetrates a gas collection cavity and admits the liquid into a bottom of membrane filter; and initially filling a gas volume arranged below a free surface of the liquid and defined in a downward direction by an enclosed level of the liquid with the gas wherein the gas simultaneously displaces the liquid top down from a gas lifting channel until the enclosed level of the liquid drops below an inlet cross section of a gas flow out channel; and subsequently flowing the gas out of the gas volume downward through the gas lifting channel, a deflection portion adjoining at a bottom of the gas lifting channel, in upward direction through the inlet cross section and through the gas flow out channel adjoining the inlet cross section at a top and flowing the gas to the free surface, wherein a housing laterally develops the membrane and adjoins the gas introduction device on top.

Improving upon the known method it is proposed according to the invention that a housing laterally envelops the membranes and directly adjoins the gas introduction device on top.

Thus, it is an advantage of this configuration of the membrane filter that gas introduced into the membrane filter cannot exit the membrane filter due to the housing adjoining the gas introduction device without gaps and then laterally enveloping the membranes so that the gas is effectively used to flush the membranes.

Thus, it is an advantage that also the liquid displaced by the air cannot laterally escape from the membrane filter which increases the acceleration of the liquid column. The bubble forming from the introduced gas in the housing and initially rising in cohesion accelerates the liquid column arranged there above so that it also flows with a high velocity past the membranes and that it dislodges accretions from the membranes due to shear forces generated. The cleaning effect of the introduced air is improved through both effects approximately by an order of magnitude and energy to be used for cleaning is reduced accordingly.

Advantageously a blocking flow of the liquid runs through a compensation inlet below the gas lifter inlet to the inlet cross section and is then pulled along by the gas until the liquid fills the deflection portion and thus closes the inlet cross section for the gas.

According to the method according to the invention the level in the liquid in the gas introduction device rises again during the emptying of the gas volume, wherein the gas volume is displaced by the liquid flowing in from below. Thus, the suction effect of the gas rising into the flow out channel causes a blocking flow of the liquid to be pulled through the compensation inlet and to flow to the inlet cross section. This blocking flow of the liquid is pulled along by the gas so that the liquid fills the deflection portion and thus fills the inlet cross section and therefore closes like a valve for the gas.

Thus, the method according to the invention assures that the flow out of the gas is interrupted at a point in time when the gas volume is substantially emptied even under a high gas volume flow feed and the gas volume can be filled again. Thus, a pulsating of the gas is also secured at a high gas volume flow feed.

Advantageously gas only flows through the gas outflow channel in a method according to the invention after the level has dropped below the inlet cross section until the level rises above the compensation inlet and only then the blocking flow runs through the compensation inlet to the inlet cross section. The geyser then also pulls along liquid shortly before emptying even when there are greater air flows so that stopping the geyser is assured and refilling can commence.

This means that the compensation inlet is in gas communication at the beginning of the gas flow through the outlet channel, this means the compensation inlet is within the gas filled gas collection cavity when performing the method according to the invention. This assures that emptying the gas volume starts reliably even at the extremely low gas volume flows since no liquid flow impedes the gas suction effect and thus the emptying of the gas volume by lifting the gas.

The geyser then commences emptying even at a very small air flow.

Thus, the method according to the invention has the advantage that substantially constant gas volume feed can be varied in a very wide range and is then introduced into the membrane filter with a stable pulsing. Thus, the pulsing gas volume flow through the membrane filter can be adapted in an energy saving manner to the respective filtration performance over a wide range of filtration performance variations.

This means the method according to the invention allows operating the membrane filter at a variable filtration performance also with a variable gas volume flow feed in a reliable and pulsing manner in order to implement an effective flushing of the membranes at low energy consumption.

The object is also achieved by a filter device including a membrane filter for filtering a liquid, the membrane filter including membranes and a gas introduction device arranged below the membranes, the gas introduction device including a liquid flow channel which vertically penetrates the gas collection cavity and admits the liquid into a bottom of membrane filter, a gas collection cavity which is open at a base and defined by an upper wall and a lateral wall, a gas inlet configured to flow a gas into the gas collection cavity, a gas lifting channel configured to siphon a gas out of the gas collection cavity and empty the gas collection cavity, the gas lifting channel including a gas lifting inlet at a top in the gas collection cavity, a deflection portion arranged at a bottom of the gas lifting channel, an inlet cross section arranged at a top of the deflection portion wherein a gas outflow channel is connected at a top of the inlet cross section, and a housing which laterally envelops the membranes and which is connected to the gas introduction device at a top of the gas introduction device.

Improving upon the known filtering device it is proposed according to the invention that a housing laterally envelops the membranes and directly adjoins the gas introduction device on top. The filtering device according to the invention facilitates performing the method according to the invention and is characterized by the advantages described supra.

Advantageously the filtering device according to the invention includes a gas introduction device including a compensation inlet below the gas lifter inlet wherein the compensation inlet is flowable up the inlet cross section. Further advantageously the compensation inlet is arranged at a level of the inlet cross section or above. Thus, the compensation inlet is arranged below the upper wall and above or at the same level of the inlet cross section. Thus, the compensation inlet is in gas communication when the gas collection cavity is filled and the compensation inlet is in liquid communication when the gas collection cavity is empty. This has the advantages described supra for the start and stop process of the geyser process of pulsating emptying and filling the gas collection cavity.

In a simple embodiment of the filter device according to the invention, the compensation inlet leads into the gas lifting channel. Since the liquid is introduced in this embodiment directly into the strong downward running gas volume flow in the gas lifting channel, the pull along effect from the gas is comparatively strong which limits an increase of the gas volume flow feed. This effect can be counteracted by enlarging the compensation inlet which leads to a limitation of the gas volume flow feed in downward direction since the gas volume above the compensation inlet is then not pulled empty.

In another embodiment of the filter device according to the invention a compensation channel adjoins the compensation inlet in a direction towards the deflection portion. Through the compensation channel the position of the compensation inlet and the location of introducing the liquid blocking flow into the exiting gas flow are decoupled which leads to an increase of the variation of the gas volume flow feed.

In an advantageous embodiment of the filter device the compensation channel leads into the deflection portion parallel to the gas lifting channel. Thus, a location of introduction of the blocking liquid flow is displaced downward as far as possible. This has the advantage that the liquid is fed separately from the gas volume flow exactly to the location where the liquid shall create the blocking effect for the gas which assures a stop of the exiting gas flow also at higher gas volume flow feeds.

The gas volume flow feed can be increased even further while reliably maintaining pulsation using an alternative embodiment of the filter device according to the invention, by making a cross section of the compensation inlet larger than a minimum cross section of the compensation channel when connecting the compensation channel and the gas lifting channel in parallel with one another to the deflection portion. This increases the blocking flow of the liquid and a quicker and thus more reliable closing of the inlet cross section for the gas is also provided for a higher gas volume flow feed.

Thus, the membrane filter can also be configured with different types of membranes like e.g; hollow filter membranes, plate membranes, cushion membranes or hollow fiber membranes connected to form curtains. The membranes are advantageously from the field of ultra or micro filtration membranes with a pore size between 0.02 μm and 1 μm. However, also other membranes from the field of nanofiltration or low pressure reverse osmosis can be used.

Since the liquid volume within the membrane filter has to be replaced while flushing the membranes with the gas in order to prevent a concentration of the substances in the filter that were previously retained by the membranes the gas introduction device includes a liquid flow channel that vertically penetrates the gas collection cavity in order to let liquid flow into a bottom of the membrane filter.

In an advantageous embodiment of the filter device according to the invention the housing of the membrane filter is configured as a tube. The tube can have a circular, rectangular, or any other cross section. The advantage of the tube is economical fabrication e.g. by extrusion.

In order to distribute air in an optimum manner that is introduced from the gas introduction device into the membrane filter an embodiment of the filter device according to the invention includes a gas distributor below the membranes, wherein the flow out channel leads into the gas distributor.

In the filter device according to the invention the flow channels are partially or completely formed by walls of a housing of the gas introduction device. The flow channels include the flow out channel, the compensation channel and the deflection portion.

BRIEF DESCRIPTION OF THE DRAWINGS

The invention is subsequently described in more detail based on an advantageous embodiments with reference to drawing figures, wherein.

DETAILED DESCRIPTION OF THE INVENTION

Figures 1A, 1B:
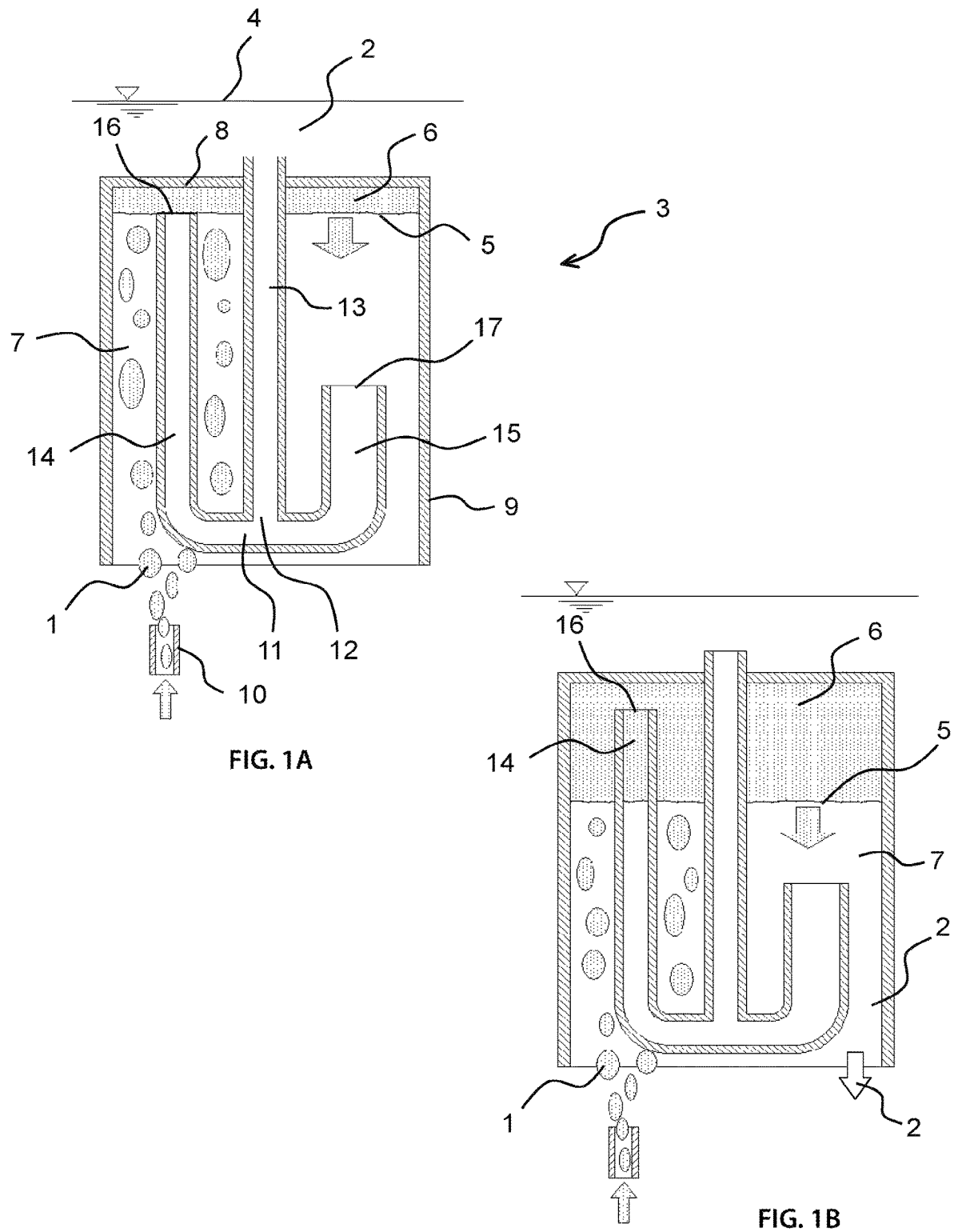
FIGS. 1A-I illustrate process steps of a method according to the invention showing a gas introduction device according to the invention in sectional views.

The drawing figures are not to scale. All details of the subsequently described methods or gas filtering devices are identical with the embodiments of the filtering devices according to the invention described supra.

FIG. 1A shows the process steps of a first method according to the invention for introducing a gas 1 into a liquid 2 using a first gas introduction device 3 according to the invention illustrated sectional views.

The gas introduction device 3 includes a gas volume 6 that is arranged below a surface 4 of the liquid 2 and defined in downward direction by a level 5 of the liquid 2. The gas volume 6 is arranged in a gas collection cavity 7 that is defined by an upper wall 8 and a side wall 9. Through a gas inlet 10 installed below the gas collection cavity 7 and separate from the gas collection cavity 7 gas 1 is introduced into the gas collection cavity 7 and thus fills the gas volume 6 so that the level 5 of the liquid 2 goes down. Thus, the liquid 2 that is in the gas collection cavity 7 is displaced at this point in time successively by inflowing gas 1 in downward direction and replaced by the gas 1.

The gas introduction device 3 according to the invention includes a deflection portion 11 which includes an inlet cross section 12 on top wherein a gas outflow channel 13 joins the inlet cross section on top. A gas lifting channel 14 and a compensation channel 15 lead into the deflection portion 11. The gas lifting channel 14 includes an open gas lifting inlet 16 in a top of the gas collection cavity 7 and the compensation channel 15 includes a compensation inlet 17 below the upper wall 8 in the gas collection cavity 7, wherein the cross section of the compensation inlet 17 is sized larger than the minimum cross section of the compensation channel 15. Furthermore, the gas outlet channel 13 penetrates the upper wall 8.

Figure 1C:
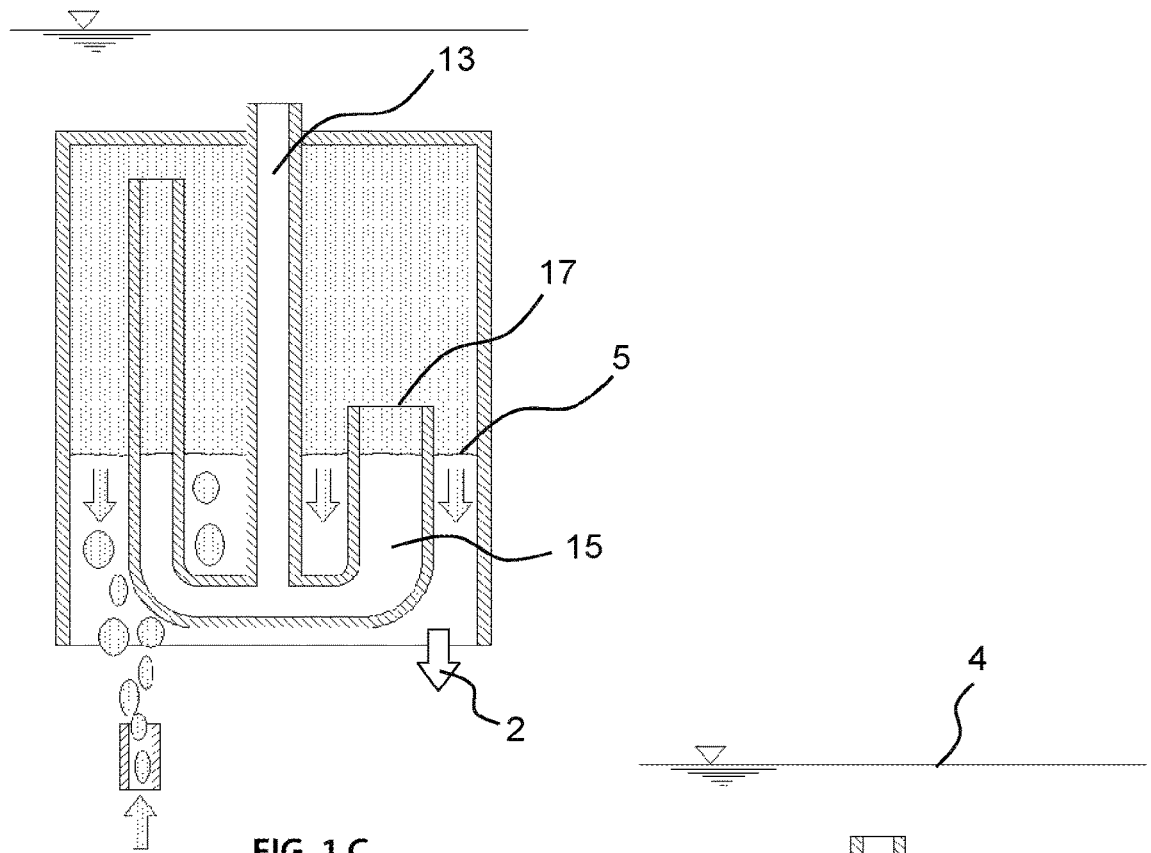
Figure 1D:
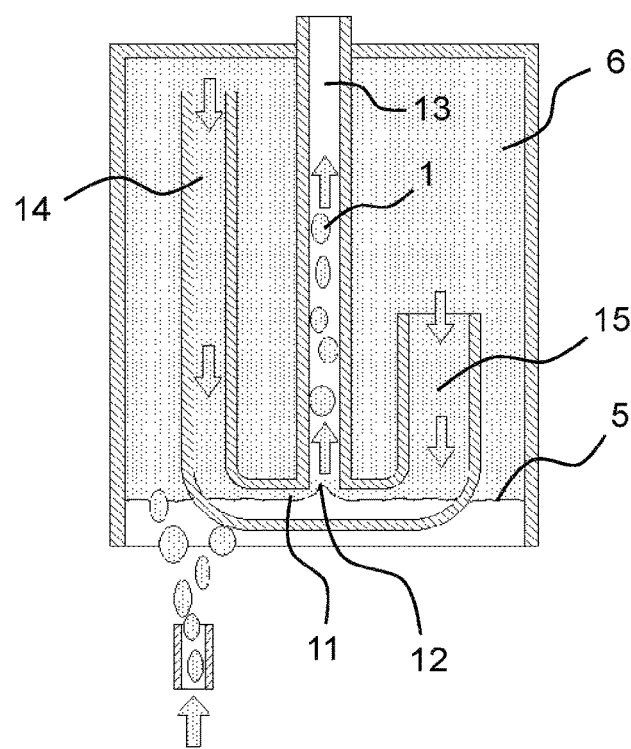

FIGS. 1B-1D show additional filling of the gas collection cavity 7 with the gas 1 and thus an additional filling of the gas volume 6 and an additional lowering of the level 5 of the liquid 2. As illustrated in FIG. 1B, gas 1 moves from above through the gas lifting inlet 16 into the gas lifting channel 14 when filling the gas volume 6 so that the gas lifting channel 14 is filled with the gas 1 top down.

In FIG. 1C the level 5 has dropped below the compensation inlet 17 and gas 1 moves from above into the compensation channel 15. During the method steps shown in FIGS. 1A-1C, the gas flow out channel 13 remains filled with fluid 2, this means no gas flows out of the gas introduction device 3.

In FIG. 1D, the level 5 of the liquid 2 has dropped below the inlet cross section 12. From this moment the gas 1 flows out of the gas volume 6 through the gas lifting channel 14 and the compensation channel 15 in downward direction to the deflection portion 11 and thereafter through the inlet cross section 12 and the subsequent gas flow out channel 13 to the surface 4.

Figure 1E:
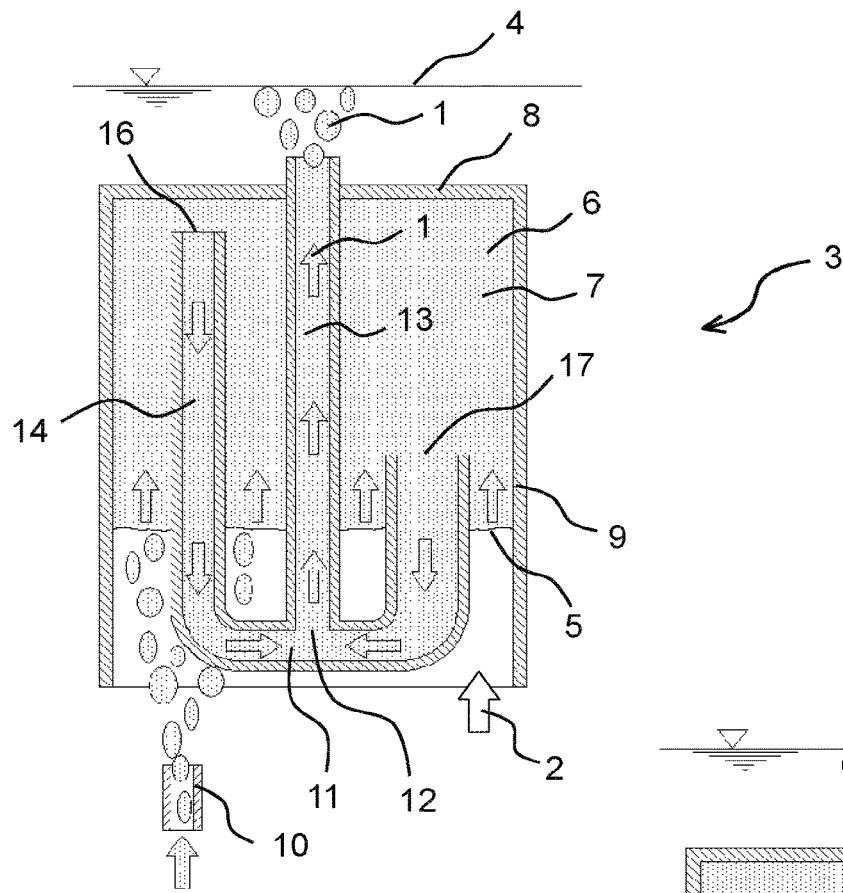

FIG. 1E shows how the gas volume 6 in the gas collection cavity 7 is reduced by the outflowing gas 1. Thus, gas 1 flowing out of the gas collection cavity 7 is successively replaced by liquid 2 that flows in from below so that the level 5 of the liquid 2 rises again.

The gas 1 flowing out through the gas flow out channel 13 generates a vacuum in the gas flow out channel 13 and in the adjoining gas lifting channel 14 and in the compensation channel 15. Since the gas lifting inlet 16 as well as the compensation inlet 17 are arranged at this point in time in the gas volume 6 filled with the gas 1 in the gas collection cavity 7, initially only the gas 1 flows through the gas outlet channel 13 induced by the suction created.

Figure 1F:
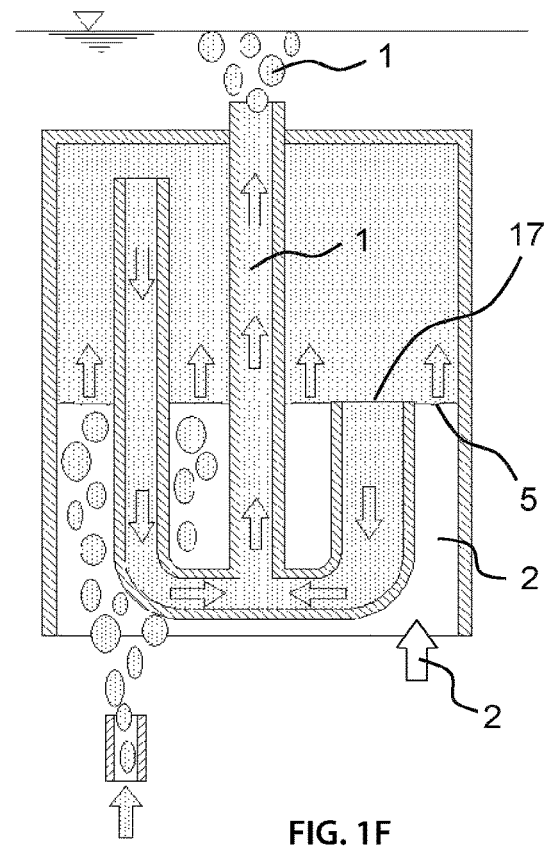

FIG. 1F shows the moment in time when the level 5 of the liquid 2 reaches the compensation inlet 17. Up to this point in time, only gas 1 has flowed through the gas outlet channel 13.

Figure 1G:
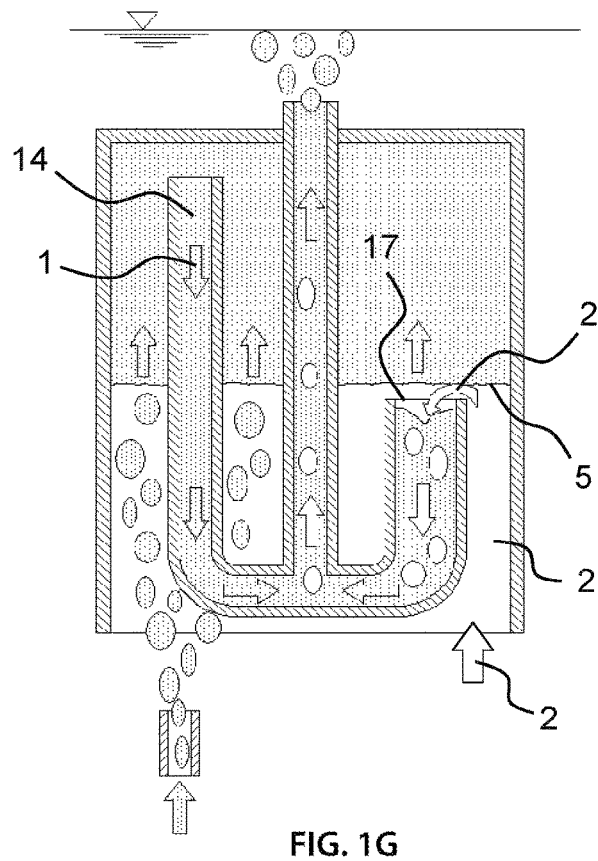

FIG. 1G shows how the compensation inlet 17 is flooded with fluid 2 during a further increase of the level 5 due to the gas flowing out through the gas lifting channel 14.

Figure 1H:
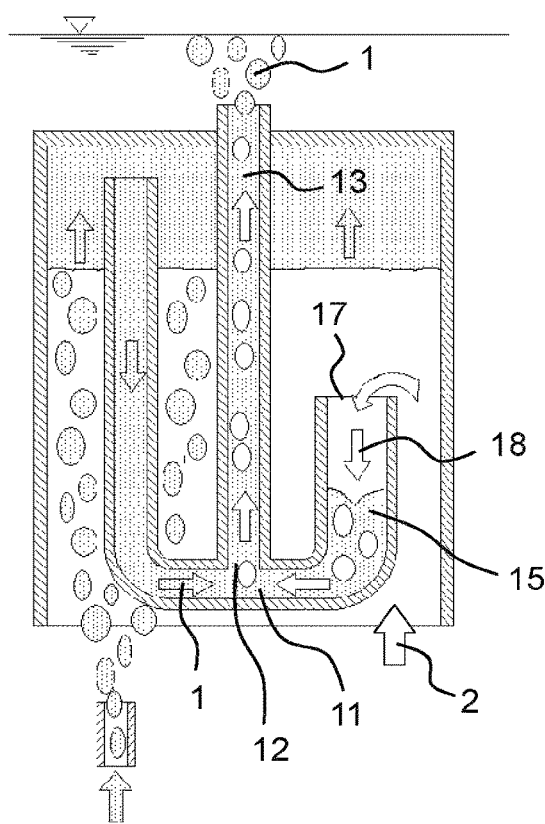
Figure 1I:
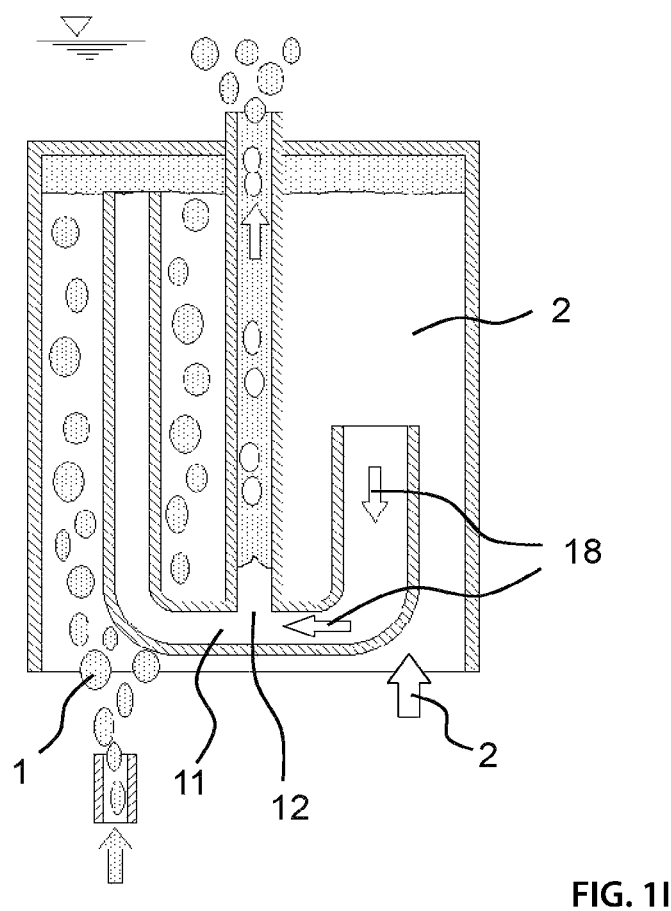

FIG. 1H shows how a blocking flow 18 of the liquid 2 is pulled through the compensation inlet 17 through the suction effect of the gas 1 flowing out of the gas flow out channel 13 so that the blocking flow 18 of the liquid 2 flows through the compensation channel 15 to the inlet cross section 12 and is pulled along by the outflowing gas 1 until the blocking flow 18 of the liquid 2 fills the deflection portion 11 in FIG. 1I and closes the inlet cross section 12 for the gas 1 like a valve.

Figure 2:
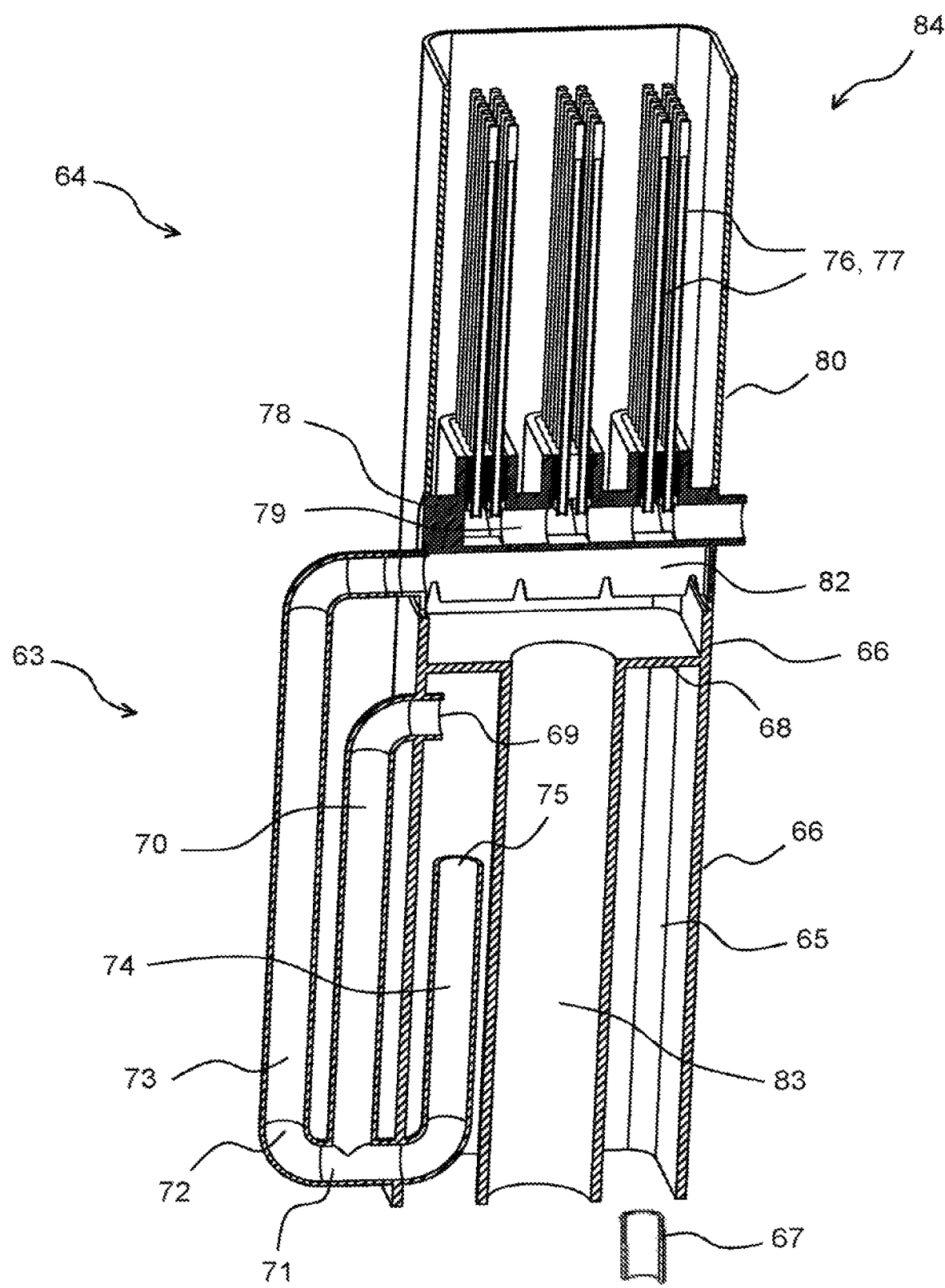
FIG. 2 illustrates a filter device according to the invention.

FIG. 2 illustrates a sectional view of a gas introduction device 63 according to the invention which is mounted below a membrane filter 64. The gas introduction device 63 has a gas collection cavity 65 that is laterally defined by a lateral wall 66 configured as a rectangular tube with 20 cm lateral width. The gas collection cavity 65 is open in a downward direction with a gas inlet 67 arranged there under and configured to fill the gas collection cavity 65 with a gas during operations. A gas lifting inlet 69 leads into the gas collection cavity 65 on top below an upper wall 68 wherein a gas lifting channel 70 adjoins the gas lifting inlet 69. The gas lifting channel 70 leads at a bottom into a deflection portion 71 which is adjoined by an inlet cross section 72 on top. The deflection portion 71 runs through a lateral wall 66 at a bottom. A gas outlet channel 73 is connected to the inlet cross section 72 on top. Additionally, the gas introduction device 63 includes a compensation channel 74 that is arranged within the side wall 66. The compensation channel 74 includes a compensation inlet 75 at a top of the gas collection cavity 65 and leads into the deflection portion 71 at a bottom. The membrane filter 64 includes membranes 76 configured as hollow fiber membranes 77 which are cast into a base element 78 at a bottom. The base element 78 includes a permeate collection cavity 79 wherein the hollow fiber membranes 77 are connected with an open lumen side to the permeate collection cavity in order to extract a filtrate out of the lumen of the hollow fiber membranes 77. The hollow fiber membranes 77 are individually closed on top and are laterally enveloped by a continuous housing 80 which is configured as a rectangular tube with identical cross-sectional dimensions as the lateral wall 66 and that adjoins the lateral wall 66 on top. Below the base element 78 the membrane filter 64 includes a gas distributor 82 wherein the gas flow out channel 73 leads into the gas distributor 82. The gas introduction device 63 includes a liquid flow channel 83 that vertically penetrates the gas collection cavity 65 and the upper wall 68 in order to let a liquid flow into the bottom of the membrane filter 63. The combination of gas introduction device 63 and membrane filter 64 jointly forms a filtering device 84.

REFERENCE NUMERALS AND DESIGNATIONS 1 gas
2 liquid
3 gas introduction device
4 surface
5 level
6 gas volume
7 gas collection cavity
8 upper wall
9 side wall
10 gas inlet
11 deflection portion
12 inlet cross section
13 gas flow out channel
14 gas lifting channel
15 compensation channel
16 gas lifting inlet
17 compensation inlet
18 blocking flow
63 gas introduction device
64 membrane filter
65 gas collection cavity
66 side wall
67 gas inlet
68 upper wall
69 gas lifting inlet
70 gas lifting channel
71 deflection portion
72 inlet cross section
73 gas outlet channel
74 compensation channel
75 compensation inlet
76 membrane
77 hollow filter membrane
78 base element
79 permeate collection cavity
continuous tubular housing
82 gas distributor
83 liquid flow channel
84 filter device

What is claimed is:

1. A method for filtering a liquid in a membrane filter immersed in the liquid and including membranes, the method comprising:
   introducing a gas through a gas introduction device into a base of the membrane filter in successive pulses so that the membranes are cleaned wherein the gas introduction device includes a liquid flow channel which vertically penetrates a gas collection cavity and admits the liquid into a bottom of membrane filter; and initially
   filling a gas volume arranged below a free surface of the liquid and defined in a downward direction by an enclosed level of the liquid with the gas wherein the gas simultaneously displaces the liquid top down from a gas lifting channel until the enclosed level of the liquid drops below an inlet cross section of a gas flow out channel; and subsequently
   flowing the gas out of the gas volume downward through the gas lifting channel into a deflection portion connected at a bottom of the gas lifting channel and closed at a bottom side, from the channel with the deflection portion in an upward direction through the inlet cross section and through the gas flow out channel adjoining the inlet cross section at a top and flowing the gas to the free surface,
   running a blocking flow of the liquid downward through a compensation inlet arranged below a gas lifting inlet to the inlet cross section, wherein the gas lifting inlet is arranged at a level of the inlet cross section or above; and
   moving the blocking flow of the liquid along by the gas until the liquid fills the deflection portion and closes the inlet cross section for the gas,
   wherein a continuous tubular upward open housing laterally envelops the membranes over an entire length of the membranes and is connected to the gas introduction device without gaps on top of the gas introduction device.

2. The method according to claim 1, further comprising:
   after the level of the liquid in the deflection portion has dropped below the inlet cross section initially only flowing the gas through the gas flow out channel until the level of the liquid adjacent to the compensation inlet rises above the compensation inlet; and
   only then running the blocking flow through the compensation inlet to the inlet cross section.

3. A filter device, comprising:
   a membrane filter for filtering a liquid, the membrane filter including membranes and a gas introduction device arranged below the membranes; and
   a housing which laterally envelops the membranes over an entire length of the membranes and which is connected to the gas introduction device without gaps at a top of the gas introduction device,
   the gas introduction device including
   a liquid flow channel which vertically penetrates a gas collection cavity and admits the liquid into a bottom of the membrane filter, wherein the gas collection cavity is open at a base and defined by an upper wall and a lateral wall,
   a gas inlet configured to flow a gas into the gas collection cavity,
   a gas lifting channel where gas flows out of the gas collection cavity and empties the gas collection cavity, the gas lifting channel including a gas lifting inlet at a top in the gas collection cavity, a deflection portion connected at a bottom of the gas lifting channel and closed at a bottom side, and an inlet cross section arranged at a top of the deflection portion wherein a gas outflow channel is connected at a top of the inlet cross section.

4. The filter device according to claim 3, wherein a compensation inlet is arranged above and leading into a downwards extending compensation channel, and wherein the compensation inlet is arranged below the gas lifting inlet and the downwards extending compensation channel is arranged open towards the inlet cross section.

5. The filter device according to claim 4, wherein the compensation inlet is arranged at a level of the inlet cross section or above.

6. The filter device according to claim 4, wherein the downwards extending compensation channel which connects to the compensation inlet in a direction towards the deflection portion.

7. The filter device according to claim 6, wherein the downwards extending compensation channel leads into the gas lifting channel.

8. The filter device according to claim 6, wherein the downwards extending compensation channel leads parallel to the gas lift channel into the deflection portion.

9. The filter device according to claim 6, wherein a cross section of the compensation inlet is larger than a minimum cross section of the downwards extending compensation channel.

10. The filter device according to claim 3, wherein the housing is a continuous tube.

11. The filter device according to claim 3, further comprising a gas distributor arranged below the membranes, wherein the gas outflow channel leads into the gas distributor.

12. A filter device, comprising:

a membrane filter for filtering a liquid, the membrane filter including membranes and a gas introduction device arranged below the membranes; and a housing which laterally envelops the membranes over an entire length of the membranes and which is connected to the gas introduction device without gaps at a top of the gas introduction device, the gas introduction device including a liquid flow channel which vertically penetrates a gas collection cavity and admits the liquid into a bottom of the membrane filter, wherein the gas collection cavity is open at a base and defined by an upper wall and a lateral wall, a gas inlet configured to flow a gas into the gas collection cavity, a gas lifting channel including a gas lifting inlet at a top in the gas collection cavity, a deflection portion connected at a bottom of the gas lifting channel and closed at a bottom side, an inlet cross section arranged at a top of the deflection portion wherein a gas outflow channel is connected at a top of the inlet cross section, and a compensation inlet arranged below the gas lifting inlet to the inlet cross section, wherein the gas lifting inlet is arranged at a level of the inlet cross section or above; and wherein a blocking flow of the liquid downward runs through the compensation inlet, and wherein moving the blocking flow of the liquid along by the gas until the liquid fills the channel with the deflection portion and closes the inlet cross section for the gas.

13. A method for filtering a liquid in a membrane filter immersed in the liquid and including membranes, the method comprising:

introducing a gas through a gas introduction device into a base of the membrane filter in successive pulses so that the membranes are cleaned wherein the gas introduction device includes a liquid flow channel which vertically penetrates a gas collection cavity and admits the liquid into a bottom of membrane filter; and initially filling a gas volume arranged below a free surface of the liquid and defined in a downward direction by an enclosed level of the liquid with the gas wherein the gas simultaneously displaces the liquid top down from a gas lifting channel until the enclosed level of the liquid drops below an inlet cross section of a gas flow out channel; and subsequently flowing the gas out of the gas volume downward through the gas lifting channel into a deflection portion connected at a bottom of the gas lifting channel and closed at a bottom side, from the deflection portion in an upward direction through the inlet cross section and through the gas flow out channel adjoining the inlet cross section at a top and flowing the gas to the free surface, wherein a continuous tubular upward open housing laterally envelops the membranes over an entire length of the membranes and is connected to the gas introduction device without gaps on top of the gas introduction device.

* * * * *